(12) United States Patent
Kleyer et al.

(10) Patent No.: US 7,587,710 B2
(45) Date of Patent: Sep. 8, 2009

(54) METHOD FOR DETERMINING THE PROCESSING SEQUENCE OF FUNCTION BLOCKS OF AN AUTOMATED SYSTEM AND CORRESPONDING AUTOMATED SYSTEM

(75) Inventors: Dieter Kleyer, Herzogenaurach (DE); Wolfgang Ott, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 795 days.

(21) Appl. No.: 10/545,039

(22) PCT Filed: Sep. 14, 2003

(86) PCT No.: PCT/EP03/10636

§ 371 (c)(1),
(2), (4) Date: Aug. 11, 2005

(87) PCT Pub. No.: WO2004/072744

PCT Pub. Date: Aug. 26, 2004

(65) Prior Publication Data

US 2006/0248408 A1    Nov. 2, 2006

(30) Foreign Application Priority Data

Feb. 14, 2003   (EP)   .................................. 03003382

(51) Int. Cl.
*G06F 9/45* (2006.01)
(52) U.S. Cl. ........................ 717/133; 717/131; 717/132; 717/141; 717/142; 717/143; 717/154; 717/155
(58) Field of Classification Search ........................ None
See application file for complete search history.

(56) References Cited

U.S. PATENT DOCUMENTS

| | | | |
|---|---|---|---|
| 5,349,518 A | 9/1994 | Zifferer et al. | |
| 5,377,315 A | 12/1994 | Leggett | |
| 6,233,703 B1 | 5/2001 | Powers | |
| 6,618,745 B2 * | 9/2003 | Christensen et al. | 709/201 |
| 2003/0139837 A1 * | 7/2003 | Marr | 700/110 |

\* cited by examiner

*Primary Examiner*—Chuck O Kendall

(57) ABSTRACT

The invention relates to a method and an automated system for determining the processing sequence of function blocks of a technological function. According to said method, a first function block, whose outputs are respectively disconnected or form exclusively one or more output signals of the technological function, is determined. Starting from said first function block, a second function block is sought in the opposite direction to the signal flow direction, whereby the block inputs of said second block are respectively disconnected or receive one or more input signals of the technological function only. An identifier is given to all block inputs, which are disconnected, receive an input signal from the technological function only or are connected to at least one block output of another function block whose block inputs have previously been given identifiers, starting from and including the second function block, running through subsequent function blocks in the signal flow direction up to and including the first function block. The function block is marked as soon as its block inputs have been given identifiers. Finally, the processing sequence of the function blocks is achieved in accordance with the marking sequence of the function blocks.

2 Claims, 2 Drawing Sheets

METHOD FOR DETERMINING THE PROCESSING SEQUENCE OF FUNCTION BLOCKS OF AN AUTOMATED SYSTEM AND CORRESPONDING AUTOMATED SYSTEM

CROSS REFERENCE TO RELATED APPLICATION

This application is the U.S. National Stage of International Application No. PCT/EP2003/010636, filed Sep. 24, 2003 and claims the benefit thereof. The International Application claims the benefits of European Patent applications No. 03003382.3 EP filed Feb. 14, 2003, both of the applications are incorporated by reference herein in their entirety.

FIELD OF THE INVENTION

The invention relates to a method for determining the processing sequence of function blocks, in particular in the configuration/programming of automated systems by means of graphical tools. It relates further to an automated system for implementing the method.

BACKGROUND OF THE INVENTION

Programs in automated systems are typically organized with the aid of so-called organization blocks, program blocks and function blocks.

An increasing number of graphical editors are used in the configuration/programming of automated systems, by means of which block symbols of the elementary operations and basic functions running in the automation devices are interconnected to form more complex networks.

The organization blocks and program blocks are subsequently generated for control programs of the automated system from these networks shown in graphical form, with the aid of code generators or so-called 'mappers'.

In this case the processing sequence of these blocks must also be determined.

This is usually done manually by the user, in which he sets corresponding block parameters for example. Automatic advanced occupation for these block parameters, which are, if necessary, automatically generated by the automated system, and are derived from the chronological processing of the block symbols or from the otherwise determined initial values, must generally be overwritten again by the user, since the processing sequence resulting therefrom is generally not suited to correctly implementing the technological function of a block network during the program run.

In the case of configuration and programming, the result here is that a very considerable manual effort must be carried out in order to determine the processing sequence of the function blocks. In particular, after every change in the network, a change in the processing sequence and its documentation and test runs of the changed network are required, this being very expensive and prone to fault.

With complex automation tasks, several hundred block symbols can be arranged and interconnected on function charts. The manual determination of the processing sequence of the function blocks is thus a very costly and error-prone method, particularly for such networks structured in such a complex manner.

SUMMARY OF THE INVENTION

The object underlying the invention is thus to specify an improved method and an automated system for determining the processing sequence of function blocks, with which the method, in particular EDP-supported method, is to be used to ensure that the quality of the networks generated in such a manner is maintained.

The object is achieved according to the invention by means of a method and an automated system with the features of the independent claims 1 and 3 respectively. The basis of the method according to the invention is the so-called IPO method (Input-Process-Output). The network signals are thus fundamentally processed in the sequence input-process-output.

In particular, this ensures that a 'cyclical offset' between input and processing is avoided, such that no result determination is carried out in a processing cycle, without the intermediate results required for further processing at this time already being present in this current processing cycle.

Before a function block according to the method according to the invention is processed, cross-functional criteria must be noted. To this end, the function charts relating to the functions represented thereby are analyzed. In the processing cycle of an automation device, those program blocks which operate input functions such as measurement value detection for instance are invoked at first. Next those program blocks are operated which implement processing functions, for example regulation and control functions, and finally those program blocks which comprise output functionality are invoked.

Consequently the sequence input-processing-output is also maintained in this cross-functional view.

According to the method according to the invention the processing sequence of function blocks is determined within a technological function; thus a functional local processing sequence is determined.

The network type must also be considered for the determination of the processing sequence, said network type forming the basis of the technological function. Furthermore, the storage location of intermediate results can play a role, for example as to whether these intermediate results are written to a register or to a global data block.

Elementary Network Types:
 Open sequential networks: these are thus networks with the structure according to FIG. 1. The method according to the invention can be used directly on networks of this type.
 Interconnection of open sequential networks to form a global network of dependent sub-networks: Networks of this type have for instance the structure according to FIG. 2. In this case the global network can be divided into sub-networks. Some of these sub-networks can be processed independently of one another in terms of determining their processing sequence, while some of the networks can be instructed to the existence of processing results from other sub-networks. The processing sequence of the independent sub-networks with one another is then random, while processing cannot be started by a dependent sub-network until the sub-network arranged upstream has made its intermediate results available.
 Complex sequential network structures: The already mentioned network types can be further widely combined with one another, so that any number of complex network structures result. Networks of this type are at first to be broken down into the aforementioned network types before the processing sequence is determined.
 Networks with feedback loops: This type of network is a network in which at least one part of the output signal of at least one function block is fed back to the input of at least one preceding function block. The determination of the processing sequence for a technological function, which is implemented by means of a network fed back in this manner, is considered as a preferred embodiment according to claim 2.

If a plurality of feedback loops occurs in a network, each of these feedbacks can be dealt with according to the preferred embodiment according to claim 2.

In addition to the aforementioned difference of the network types, distinctions can also be made between binary sub-networks and block networks.

In binary sub-networks, only elementary links are processed. Generally intermediate results are stored as binary signals in registers and are not explicitly assigned.

In contrast, calculation results of any complexity are generated in common block networks, these being explicitly assigned to one or a number of data blocks in contrast with binary sub-networks and it then being possible to selectively read them in by means of a calling interface of a function block.

BRIEF DESCRIPTION OF THE DRAWINGS

Three exemplary embodiments of the invention are shown in more detail below, in which.

DETAILED DESCRIPTION OF THE INVENTION

Figure 1:
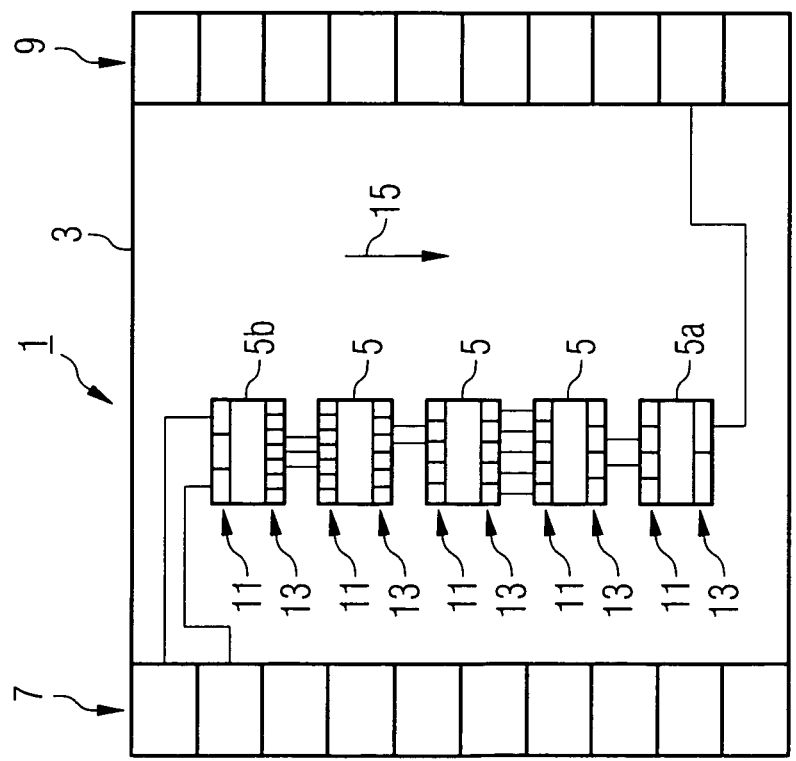
FIG. 1 shows an open sequential network for implementing the method according to the invention

FIG. 1 shows a technological function 1, represented by means of a graphic function chart 3, comprising a number of function blocks 5, 5a, 5b.

These function blocks 5, 5a, 5b each comprise block inputs 11 and block outputs 13.

By means of the block inputs 11, the function blocks 5, 5a, 5b are either fed input signals 7 as technological signals from outside the technological function 1 or one or a number of output signals 9 of another function block 5, 5a, 5b. Similarly one or a number of output signals 9 are generated by the function blocks 5, 5a, 5b, these forming either one or a number of output signals 9 of the technological function 1 or being further processed as one or a number of input signals 7 of at least one other function block 5, 5a, 5b.

In the open sequential network according to FIG. 1, the sequential signal processing is carried out in the signal flow direction 15.

A first function block 5a is determined from the number of function blocks 5, 5a, 5b, all the block outputs 13 of said function block being either unconnected or exclusively forming one or a number of output signals 9 of the technological function 1.

Based on this first function block 1, a second function block 5b is sought in the opposite direction to the signal flow direction 15, the block inputs 11 of said second function block 5b either being unconnected or receiving one or a number of input signals 7 solely from the technological function 1.

Based on this second function block 5b, in the case of the second 5b and each subsequent function block 5 in the signal flow direction 15 up to and including the first function block 5a, all block inputs 11 are characterized, each either being unconnected or receiving an input signal 7 only from the technological function 1 or being connected to at least one block output 13 of another function block 5, all the block inputs 13 of which were already characterized, in which the function block 5 is marked as soon as all its block inputs 11 are characterized. The processing sequence of the function blocks 5, 5a, 5b is finally determined according to the marking sequence of the function blocks.

For the network of the technological function 1 shown in FIG. 1, the processing sequence of the function blocks 5, 5a, 5b is thus determined in a simple manner and as a result of clear rules.

Figure 2:
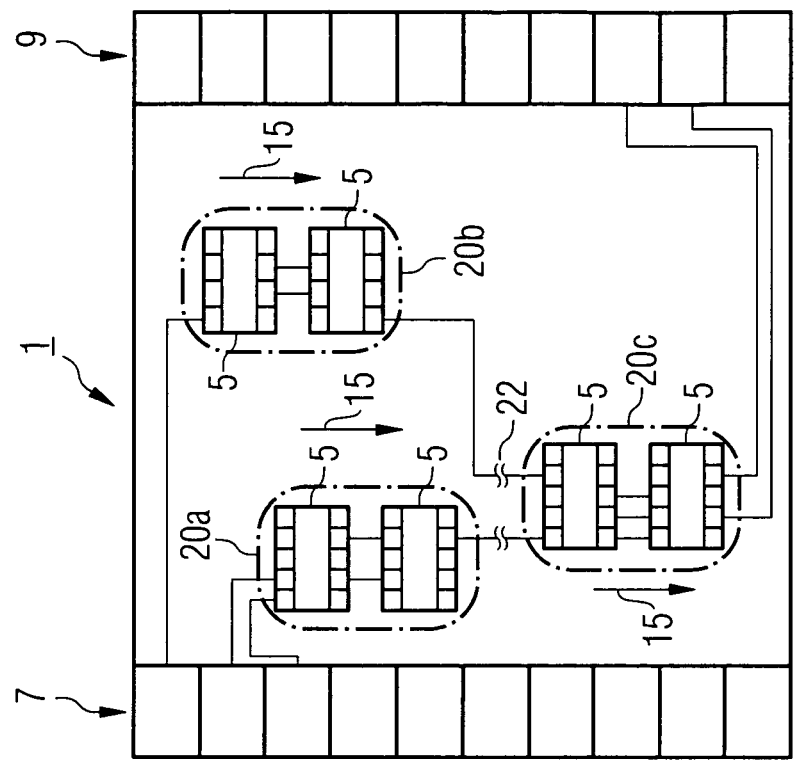
FIG. 2 shows a complex network comprising a number of sub-networks for implementing the method according to the invention

FIG. 2 shows a technological function 1, in which this technological function 1 is formed by three sub-networks 20a, 20b, 20c which are interconnected with one another.

Each of these sub-networks 20a, 20b, 20c comprises a number of function blocks 5, which are interconnected for example according to the representation in FIG. 1. The sub-networks 20a, 20b, 20c are each open sequential networks according to FIG. 1. The signal processing within the sub-networks 20a, 20b, 20c takes place in each instance in the signal flow direction 15.

The networks 20a, 20b are independent of one another, so that their internal processing sequence is independent of the processing sequence of the respective other sub-network and can be determined according to the method according to the invention.

The signal processing by the sub-network 20c nevertheless depends on the fact that the sub-networks 20a and 20b have determined intermediate results which are further processed by sub-network 20c. The internal processing sequence of the sub-network 20c cannot be independent of the processing of the sub-networks 20a and 20b; only when the intermediate results determined by these sub-networks exist can the processing be started by the sub-network 20c. This constraint must be noted with a network type according to FIG. 2. If, say, the sub-network 20c is separated from the sub-network 20a and 20b at the separation point 22, three sub-networks are achieved which each have the structure according to FIG. 1.

The internal processing sequence for each of these sub-networks can be determined according to the method according to the invention, as shown in conjunction with FIG. 1.

Figure 3:
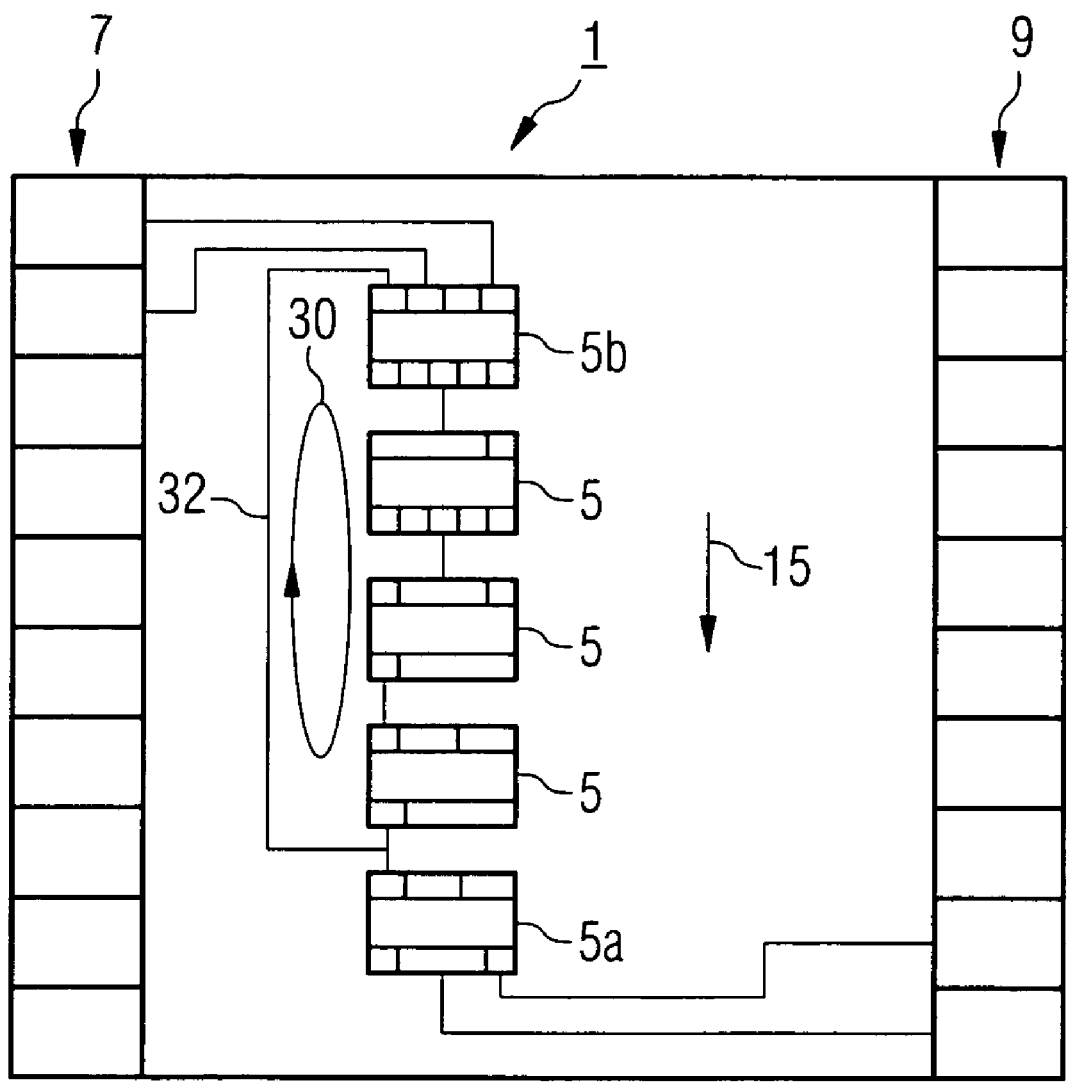
FIG. 3 shows a network with a feed back loop for implementing the method according to the invention according to a preferred embodiment.

Finally FIG. 3 shows a technological function 1 which has a number of function blocks 5, 5a, 5b interconnected with one another, a feedback loop 30 being present from the output signal of one of the function blocks to one of the preceding function blocks. Apart from a feedback signal 32 of the feedback loop 30, by means of which an output signal of the last but one function block is fed to a signal input of the first function block, the signal processing takes place in the signal flow direction 15.

A closed network of this type comprising at least one feedback loop 30 can be handled by means of a preferred embodiment of the method according to the invention, as set down in claim 2.

Thus that function block which receives the fed back signal 32 of the feedback loop 30 by means of at least one of its block inputs is determined as the second function block 5b. This means that in contrast to the open sequential network according to FIG. 1, the second function block 5b can be a function block which receives no input signals 7 from outside of the technological function 1. If for instance the feedback loop 30 in the function block in FIG. 4 was not fed back to the function block shown at first, but rather fed back to the subsequent function block, the latter function block would be the second function block 5b according to the invention and the inventive determination of the processing sequence would relate initially to all the function blocks shown in FIG. 3, with the exception of the function block shown as the first.

In summary, it is thus possible to determine that a complex network forming a technological function comprising a number of function blocks is broken down into the aforementioned elementary network types in order to implement the method according to the invention, in which taking into account their possible interactions with one another, the respective internal processing sequence is determined for the sub-network established in this way.

The invention claimed is:

1. A method for determining a processing sequence among a plurality of function blocks in an automation system to create a technological function whereby subfunctions performed in different automation devices are interconnected to form more complex networks and wherein individual devices provide input and output signals among the function blocks, comprising:

determining a first function block from among the plurality of the function blocks wherein a block output in the first function block is either unconnected or exclusively one or a number of output signals, each connected to receive data, including a measurement value, from an automation device function, the first function block providing a flow of output signals in a first signal flow direction;

determining a second function block, based on the first function block, providing signal flow in a direction opposite the first signal flow direction, wherein a block input in the second function block is either unconnected or receives one or a number of input signals each connected to implement a regulation function or a control function in the automation system;

characterizing all block inputs associated with the second function block, in the signal flow direction up to and including the first function block, each being either unconnected or receiving an input signal associated with an automation device function or being connected to at least one block output of another function block, all the block inputs of which have already been characterized, in which the function block is marked as soon as all its block inputs are characterized;

applying further program blocks to provide output functions based on data received from the automation device; and automatically determining the processing sequence of the function blocks according to the marking sequence of the function blocks, whereby subfunctions performed in different automation devices are interconnected in a sequence in accord with rules to form more complex networks and wherein individual devices provide input and output signals to create the technological function.

2. The method according to claim 1, wherein the technological function operates in accord with a feedback loop and the second of the function block receives a fed back signal of the feedback loop from at least one of its block inputs.

* * * * *